United States Patent
Dewachter et al.

(10) Patent No.: US 8,742,036 B2
(45) Date of Patent: Jun. 3, 2014

(54) CATALYST METERING DEVICE

(75) Inventors: Daan Dewachter, Mechelen (BE); Daniel Bekaert, Ronquiéres (BE)

(73) Assignee: Total Research & Technology Feluy, Seneffe (Feluy) (BE)

( * ) Notice: Subject to any disclaimer, the term of this patent is extended or adjusted under 35 U.S.C. 154(b) by 0 days.

(21) Appl. No.: 13/811,686

(22) PCT Filed: Jul. 29, 2011

(86) PCT No.: PCT/EP2011/063133
§ 371 (c)(1),
(2), (4) Date: Jan. 23, 2013

(87) PCT Pub. No.: WO2012/013795
PCT Pub. Date: Feb. 2, 2012

(65) Prior Publication Data
US 2013/0118591 A1    May 16, 2013

(30) Foreign Application Priority Data

Jul. 30, 2010 (EP) .................................. 10171371

(51) Int. Cl.
| | | |
|---|---|---|
| C08F 2/00 | (2006.01) | |
| C08F 4/00 | (2006.01) | |
| C08F 4/24 | (2006.01) | |
| C08F 4/44 | (2006.01) | |
| C08F 210/00 | (2006.01) | |
| E03B 1/00 | (2006.01) | |

(52) U.S. Cl.
USPC ............... 526/64; 526/90; 526/104; 526/128; 526/348; 137/1

(58) Field of Classification Search
CPC ..................... B01J 8/0015; B01J 2208/00752; F17D 3/00; C08F 2/06; C08F 212/00; C08F 212/02
USPC ................... 526/64, 90, 104, 128, 348; 137/1
See application file for complete search history.

(56) References Cited

U.S. PATENT DOCUMENTS

| | | |
|---|---|---|
| 3,650,641 A | 3/1972 | Reinert |
| 4,084,618 A | 4/1978 | Gurries |
| 4,610,574 A * | 9/1986 | Peters .......................... 422/131 |
| 5,211,373 A | 5/1993 | Baker |
| 2006/0027779 A1 | 2/2006 | McGuire et al. |
| 2006/0160964 A1 | 7/2006 | Gebhart et al. |
| 2011/0230627 A1 | 9/2011 | Tanghe |

FOREIGN PATENT DOCUMENTS

| | | |
|---|---|---|
| DE | 1940896 A1 | 2/1972 |
| DE | 4434713 C1 | 4/1996 |

* cited by examiner

Primary Examiner — William Cheung

(57) ABSTRACT

The invention relates to a catalyst metering device with a valve formed of an iron-based alloy steel hardened to a Rockwell hardness C of at least 60. The device can be used for metering of a catalyst for an ethylene polymerization reaction. The invention further relates to ethylene polymerization wherein the catalyst is metered in a catalyst metering device with a iron-based alloy steel hardened valve, as well as to a ethylene polymerization reactor comprising such a catalyst metering device.

15 Claims, 2 Drawing Sheets

CATALYST METERING DEVICE

CROSS-REFERENCE TO RELATED APPLICATIONS

This application claims the benefit of PCT/EP2011/063133, filed Jul. 29, 2011, which claims priority from EP 10171371.1, filed Jul. 30, 2010.

TECHNICAL FIELD OF THE INVENTION

The present invention relates to a catalyst metering device and a method for metering a catalyst slurry. This invention can advantageously be used in chemical manufacturing, specifically in the production of polyethylene (PE).

BACKGROUND OF THE INVENTION

Polyethylene (PE) is synthesized by polymerizing ethylene ($CH_2=CH_2$) monomers. Because it is cheap, safe, stable to most environments and easy to be processed polyethylene polymers are useful in many applications. According to the properties polyethylene can be classified into several types, such as but not limited to LDPE (Low Density Polyethylene), LLDPE (Linear Low Density Polyethylene), and HDPE (High Density Polyethylene). Each type of polyethylene has different properties and characteristics.

Ethylene polymerizations are frequently carried out in a loop reactor using ethylene monomer, diluent and catalyst, optionally one or more co-monomer(s), optionally activating agent, and hydrogen. The polymerization in a loop reactor is usually performed under slurry conditions, with the produced polymer usually in a form of solid particles which are suspended in the diluent. The slurry in the reactor is circulated continuously with a pump to maintain efficient suspension of the polymer solid particles in the diluent. Polymer slurry is discharged from the loop reactor by means of settling legs, which operate on a batch principle to recover the slurry. Settling in the legs is used to increase the solids concentration of the slurry finally recovered as product slurry. The product slurry is further discharged through heated flash lines to a flash tank, where most of the diluent and un-reacted monomers are flashed off and recycled.

Alternatively, the product slurry may be fed to a second loop reactor serially connected to the first loop reactor wherein a second polymer fraction may be produced. Typically, when two reactors in series are employed in this manner, the resultant polymer product is a bimodal polymer product, which comprises a first polymer fraction produced in the first reactor and a second polymer fraction produced in the second reactor, and has a bimodal molecular weight distribution.

After the polymer product is collected from the reactor and the hydrocarbon residues are removed therefrom, the polymer product is dried, additives can be added and finally the polymer may be extruded and pelletized.

During the extrusion process ingredients including polymer product, optional additives, etc, are mixed intimately in order to obtain a compound as homogeneous as possible. Usually, this mixing is done in an extruder wherein the ingredients are mixed together and the polymer product and optionally some of the additives are melted so that intimate mixing can occur. The melt is then extruded into a rod, cooled and granulated, e.g. to form pellets. In this form the resulting compound can then be used for the manufacturing of different objects.

Polymerization of ethylene involves the polymerization of ethylene monomer in the reactor in the presence of a polymerization catalyst and optionally, if required depending on the used catalyst, an activating agent. Suitable catalysts for the preparation of polyethylene, comprise chromium-type catalysts, Ziegler-Natta catalysts and metallocene catalysts. Typically, the catalyst is used in particulate form often supported on silica.

Several systems have been disclosed which involve the preparation and the supply of catalyst slurry to a polymerization reaction. In general, for preparing catalyst slurry, a mixture of dry solid particulate catalyst and diluent are apportioned in a catalyst mixing vessel and thoroughly mixed. Then such catalyst slurry is typically transferred to a polymerization reactor for contact with the monomer reactants, generally under high pressure conditions.

When feeding particulate catalyst such as silica supported catalyst adhesion of particles and degradation of the catalyst metering valve can occur. This induces mechanical wear of equipment and unstable feeding of catalyst leading ultimately to unstable reactor operations.

It is an object of the present invention to provide for a method for the delivery of catalyst wherein at least one of the above mentioned drawbacks is overcome.

SUMMARY OF THE INVENTION

The present invention aims to provide a catalyst metering device as well as methods for its usage to improve polyethylene polymerization processes. In particular, the present invention provides improved catalyst metering devices that provide longer lifetime without unintended changes and resulting in optimal reaction conditions for polyethylene polymerization.

In a first aspect, the present invention relates to a method for metering a catalyst slurry comprising the steps of:

feeding said catalyst slurry to a catalyst metering device, said catalyst metering device comprising a body, having an inlet and an outlet, comprising a rotatable catalyst metering valve, said valve comprising a catalyst metering chamber operably connected to said inlet and outlet, and a piston arranged within the chamber, characterized in that the rotatable catalyst metering valve is formed of an iron-based alloy steel hardened to a Rockwell hardness C of at least 60, wherein said metering device determines an amount of catalyst slurry to be dispensed, and dispensing said metered catalyst slurry According to another aspect, the present invention relates to a catalyst metering device comprising a body, having an inlet and an outlet, comprising a rotatable catalyst metering valve, said valve comprising a catalyst metering chamber operably connected to said inlet and outlet, and a piston arranged within the chamber, characterized in that the rotatable catalyst metering valve is formed of an iron-based alloy steel hardened to a Rockwell hardness C of at least 60.

We have further found that the device of the present invention is of particular use for solid catalysts provided on a silica support. Accordingly, in another embodiment, the invention relates to use of a catalyst metering device comprising a body, having an inlet and an outlet, comprising a rotatable catalyst metering valve, said valve comprising a catalyst metering chamber operably connected to said inlet and outlet, and a piston arranged within the chamber, characterized in that the rotatable catalyst metering valve is formed of an iron-based alloy steel hardened to a Rockwell hardness C of at least 60 for metering of a catalyst slurry comprising a solid catalyst and diluent, wherein said solid catalyst is provided on a silica support, preferably on a porous silica support.

In another embodiment, the invention relates to a method for metering a catalyst slurry comprising the steps of feeding said catalyst slurry to a catalyst metering device comprising a body, having an inlet and an outlet, comprising a rotatable catalyst metering valve, said valve comprising a catalyst metering chamber operably connected to said inlet and outlet, and a piston arranged within the chamber, characterized in that the rotatable catalyst metering valve is formed of an iron-based alloy steel hardened to a Rockwell hardness C of at least 60, wherein said metering device determines an amount of catalyst slurry to be dispensed, and dispensing said metered catalyst slurry.

We have surprisingly found that use of the specific materials for the catalyst metering valve and for the body as proposed in the present invention, lead to fewer leakages in the metering device as well as a lower chance of the metering device getting jammed.

The present invention allows for precise and well-controlled dosing over time of abrasive and viscous catalyst slurry, in particular silica supported catalyst slurry, while avoiding mechanical wear of the valve.

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous. The description is only given by way of example and does not limit the invention. The reference numbers relate to the hereto-annexed figures.

DETAILED DESCRIPTION OF THE INVENTION

Figure 1:
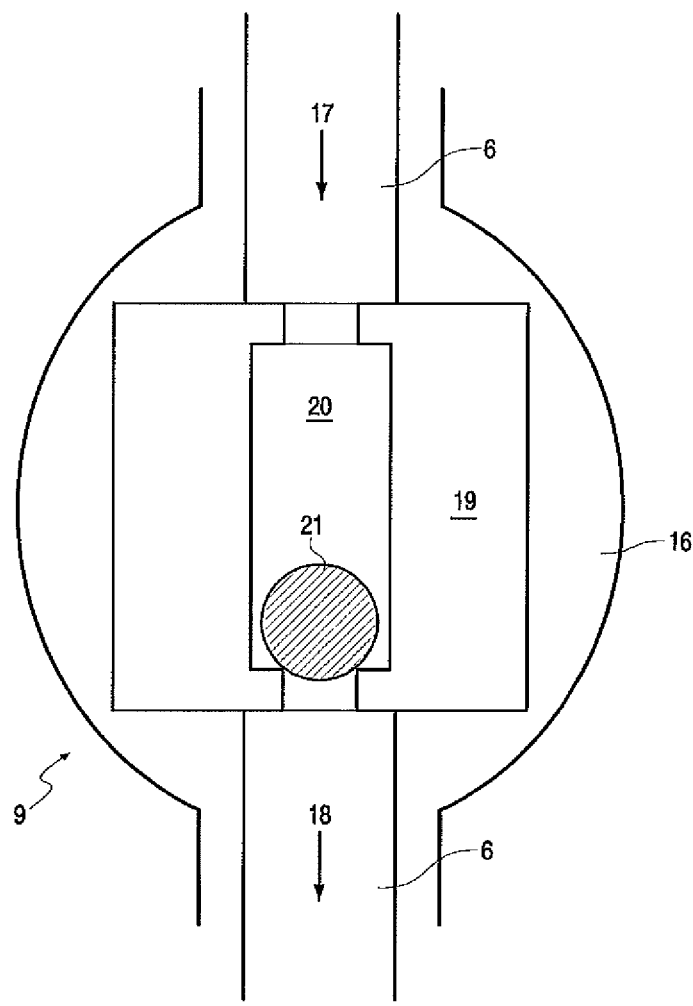
FIG. 1 schematically illustrates the cross section view of a catalyst metering device according to an embodiment present invention.

In one aspect, the present invention relates to a method for metering a catalyst slurry comprising the steps of:
  feeding said catalyst slurry to a catalyst metering device wherein said metering device determines an amount of catalyst slurry to be dispensed, and
  dispensing said metered catalyst slurry, wherein said catalyst metering device comprises a body, having an inlet and an outlet, comprising a rotatable catalyst metering valve, said valve comprising a catalyst metering chamber operably connected to said inlet and outlet, and a piston arranged within the chamber, characterized in that the rotatable catalyst metering valve is formed of an iron-based alloy steel hardened to a Rockwell hardness C of at least 60. In an embodiment said piston is a ball shaped piston.

In another aspect, the invention relates to a catalyst metering device comprising a body, having an inlet and an outlet, comprising a rotatable metering valve provided within the body, said valve comprising a catalyst metering chamber in communication with the inlet and outlet of the body in at least two positions, and a piston arranged in said chamber, wherein the valve is formed of an iron-based alloy steel hardened to a Rockwell hardness C of at least 60. In an embodiment said piston is a ball shaped piston.

In an embodiment, the metering device comprises a catalyst metering valve formed of an iron-based alloy steel hardened to a Rockwell hardness C of at least 60. Preferably, the valve is rotatable within the body of catalyst metering device. Preferably, the valve has a chamber which communicates with an inlet and an outlet in at least two positions, said chamber comprising a piston, which is capable of moving with a reciprocating motion within the chamber, as the valve containing the chamber is rotated.

Preferably, the valve is formed of an iron-based alloy steel hardened to a Rockwell hardness C of at least 61, more preferably at least 62 and preferably at most 63. Rockwell hardness is a hardness scale based on the indentation hardness of a material. The dimensionless number can be measured by determining the depth of penetration of an indenter under a large load compared to the penetration made by a preload. Rockwell hardness C, as used in the present invention, is a standard test ISO 6508-1: Metallic materials—Rockwell hardness test—Part 1: Test method (scale C) that uses a load of 150 kgf and a 120° diamond cone indenter.

Preferably, the iron-based alloy steel of the valve is in the form of a casting.

Preferred iron-based alloy steel for the catalyst metering valve comprise in weight percent: carbon from 1.2 to 1.8%, preferably 1.5%; chromium from about 10 to 14%, preferably 12%; up to 0.7% manganese, preferably 0.5%; up to 1.0% molybdenum, preferably 0.8%; up to 0.9% of silicon, preferably 0.3%; up to 1.1% Vanadium, preferably 0.9%; and at least 80% of iron. Preferably, the iron-based alloy steel is tungsten free. A preferred iron-based alloy steel is sold as Carpenter No. 610 (Carpenter Technology Corporation).

In an embodiment, the catalyst metering device has a body formed by a material having a Rockwell hardness C of at least 58. Preferably, the catalyst metering device has a body formed of an iron-based alloy steel hardened to a Rockwell hardness C of at least 58, more preferably at least 59 and most preferably at least 60. Preferred iron-based alloy steel for the body comprise in weight percent: carbon from about 0.9 to 1.2%, chromium from about 16 to 18%, up to 1% manganese, up to 0.75% molybdenum, up to 0.04% phosphorus, up to 1% silicon, up to 0.03% sulfur and at least 80% of iron. A preferred iron-based ally steel is SS440C, a stainless stain product. Preferably, the iron-alloy steel of the body is in the form of a casting.

In an embodiment, the catalyst metering valve has a piston formed by a material having a Rockwell hardness C of at least 58. Preferably, the valve has a piston formed of an iron-based alloy steel hardened to a Rockwell hardness C of at least 58, more preferably at least 59 and most preferably at least 60. Preferred iron-based alloy steel for the piston comprise in weight percent: carbon from about 0.9 to 1.2%, chromium from about 16 to 18%, up to 1% manganese, up to 0.75% molybdenum, up to 0.04% phosphorus, up to 1% silicon, up to 0.03% sulfur and at least 80% of iron. A preferred iron-based ally steel is SS440C, a stainless stain product. Preferably, the iron-alloy steel of the piston is in the form of a casting.

FIG. 1 schematically illustrates a catalyst metering device according to an embodiment of the invention. FIG. 1 presents a preferred embodiment of a metering device 9 which includes a body 16, having an inlet 17 and an outlet 18, said device comprising a catalyst metering valve 19 containing a metering chamber 20 operably connected to said inlet (17) and outlet (18), said valve 19 being rotatable within the body 16 for communicating with the inlet 17 and outlet 18 in at least two positions, said valve 19 comprising a piston 21, which moves with a reciprocating motion within the chamber 20 as the valve 19 is rotated. In an embodiment, the piston is a ball shaped piston 21. In another embodiment, said piston 21 is a cylinder (not shown). Preferably said piston is a ball. According to the invention, the valve is formed of an iron-based alloy steel hardened to a Rockwell hardness C of at least 60. In an embodiment, the piston is formed of an iron-based alloy steel hardened to a Rockwell hardness C of at least 58. Preferably, the body is also formed of an iron-based alloy steel hardened to a Rockwell hardness C of at least 58. The working mechanism of such device involves a sequence of charging, device actuation and dumping of a specific volume of catalyst slurry from a mud pot 2 to a mixing vessel 3 (see FIG. 2). During operation, when the device takes a first position, a fixed quantity of concentrated slurry flows through the inlet 17 and fills chamber 20 within the metering valve 19. Said quantity is released to the mixing vessel 3 when the device is actuated to a second position. The metering device 9 thus delivers a fixed volume of concentrated slurry from mud pot 2. Preferably, the catalyst slurry is moved from the mud pot 2 through inlet 17 and is dispensed in mixing vessel 3 through outlet 18.

More in detail the mechanism of action of this device 9 is the following. The device 9 is charged or filled with a predetermined volume of a mixture of catalyst and diluent when in a first position. Periodically this device is actuated to a second position and this volume of the mixture is dumped from the device into the mixing vessel 3. The device 9 is then recharged or refilled with the predetermined volume of the mixture in preparation for actuation back to the first position where the second volume of mixture is dumped from the device 9 into the mixing vessel 3. Concentrated slurry flow from mud pot 2 to the mixing vessel 3 is thus accomplished by the cyclic operation of the metering device 9. The cycle time of the devices determines the catalyst flow rate to the mixing vessel 3. For instance, when this cycle time is increased, the flow rate of catalyst decreases.

Figure 2:
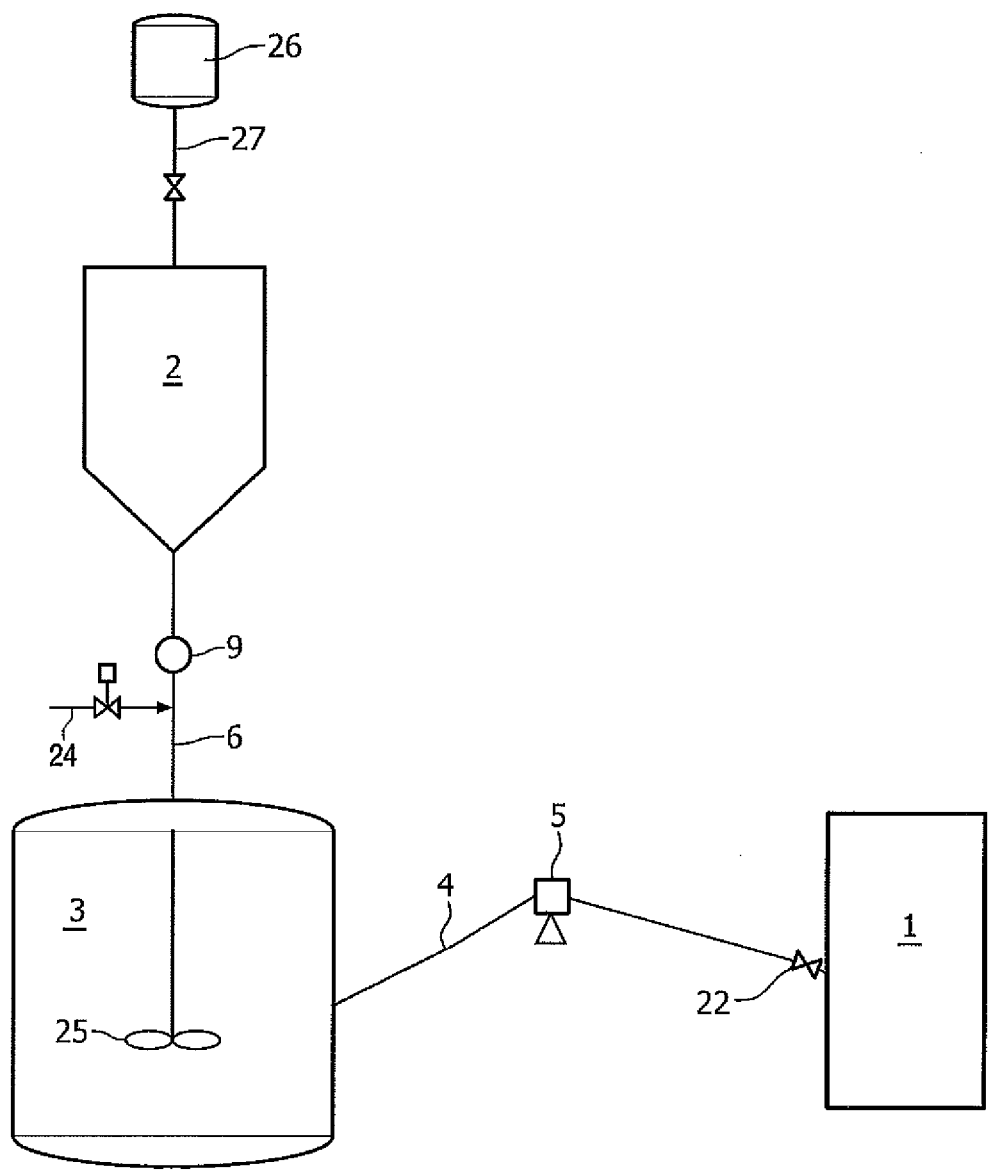
FIG. 2 schematically illustrates an embodiment of a catalyst slurry blend preparation system suitable for preparing catalyst slurry blends for the production of polyethylene.

FIG. 2 illustrates an apparatus for controlling the injection of catalyst in a polymerization reactor that may be fitted with a catalyst metering device according to the invention. The apparatus comprises one or more catalyst storage vessels 2 (one shown), or so-called mud tank or pot 2 which may contain solid-liquid slurry of catalyst and diluent, for example of metallocene catalyst and isobutane diluent.

The catalysts can be provided for examples under a dry form in commercially available drums or tote bins 26. The catalyst is transferred via a valve through line 27 to the storage vessel 2. Depending on the diluent used, it may be required to bring the catalyst under higher pressure conditions in the storage vessel 2. Using appropriate systems, the catalyst is therefore preferably transferred from such drums to a storage vessel 2, which is suitable for handling higher pressures, if this is required by the diluent. This is for instance the case when isobutane is used, since this diluent is only liquid at higher pressure levels. In case for instance hexane is used as diluent, storage vessel 2 is not required, since this diluent is liquid at low pressures. According to a preferred embodiment, a catalyst is provided from drums 26 to a storage vessel 2 through a conduit 27, preferably by means of nitrogen pneumatic transfer or by gravity. However, it is clear that also other types of catalyst feeding to the storage vessel are suitable and fall within the scope of the present invention. In an alternative embodiment, the catalyst can also be provided in a commercial container that is suitable for handling higher pressure comprised between 7 and 16 bar. In such case such commercial container is considered as a storage vessel 2 and the catalyst can be fed directly from this commercial container to a mixing vessel 3.

The catalyst slurry is transferred by means of conduit 6 from the storage vessels 2 to the mixing vessel 3 wherein said catalyst slurry is diluted for obtaining a suitable concentration for use in a polymerization reaction. The conduit 6 is preferably equipped with catalyst metering device 9 according to an embodiment of the invention allowing the feeding of a controlled flow rate of catalyst to the mixing vessel 3. The pressure difference between the storage vessel 2 and the mixing vessel 3 supplies the motive force to feed the catalyst to the mixing vessel. The metering device 9 allows the transfer of a predetermined volume of catalyst to the mixing vessel 3. A preferred embodiment of a metering device 9 is represented in FIG. 1 above. The ratio between diluent and catalyst is adequately controlled. This is enabled by adequate control of catalyst supply from the storage vessel 2 by means of the catalyst feeding system and catalyst metering device 9, and by release of a suitable amount of isobutane diluent in the mixing vessel 3 through conduit 24.

The mixing vessel 3 is also provided with a stirrer 25 for maintaining the homogeneity of the slurry. In addition, the apparatus further comprises one or more conduits 4 which connect the mixing vessel 3 to a polymerization reactor 1 and through which the diluted catalyst slurry is pumped from said mixing vessel 3 to the reactor 1, by means of pumping means 5 provided in these conduits 4. The catalyst is then supplied to the reactor 1 via one or more feeding device, such as piston device 22.

According to another aspect, the invention relates to the use of a catalyst metering device of the invention for metering of a catalyst slurry comprising a solid catalyst and diluent, wherein said solid catalyst is provided on a silica support, preferably on a porous silica support. According to one preferred embodiment, the catalyst is a metallocene type catalyst. According to another preferred embodiment, the catalyst is a chromium catalyst.

As used herein, the term "catalyst slurry" refers to a composition comprising catalyst solid particles and a diluent. The solid particles can be suspended in the diluent, either spontaneously or by homogenization techniques, such as mixing. The solid particles can be non-homogeneously distributed in a diluent and form a sediment or deposit. In the present invention it is especially applicable to solid particles of ethylene polymerization catalyst in a diluent. These slurries will be referred to as catalyst slurries.

As used herein, the term "diluent" refers to diluents, preferably in liquid form that is in a liquid state. Diluents which are suitable for being used in accordance with the present may comprise but are not limited to hydrocarbon diluents such as aliphatic, cycloaliphatic and aromatic hydrocarbon solvents, or halogenated versions of such solvents. The preferred solvents are C12 or lower, straight chain or branched chain, saturated hydrocarbons, C5 to C9 saturated alicyclic or aromatic hydrocarbons or C2 to C6 halogenated hydrocarbons. Non-limiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichioroethane and trichloroethane. In a preferred embodiment of the present invention, said diluent is isobutane. However, it should be clear from the present invention that other diluents may as well be applied according to the present invention.

As used herein, the "catalyst" refers to a substance that causes a change in the rate of a polymerization reaction without itself being consumed in the reaction. In the present invention it is especially applicable to catalysts suitable for the polymerization of ethylene to polyethylene. These catalysts will be referred to as ethylene polymerization catalysts. The invention is suitable for supported heterogeneous catalysts. In the present invention it is especially applicable to ethylene polymerization catalysts such as metallocene catalysts, Ziegler-Natta catalysts and chromium catalysts.

The term "metallocene catalyst" is used herein to describe any transition metal complexes consisting of metal atoms bonded to one or more ligands. The metallocene catalysts are compounds of Group IV transition metals of the Periodic Table such as titanium, zirconium, hafnium, etc., and have a coordinated structure with a metal compound and ligands composed of one or two groups of cyclopentadienyl, indenyl, fluorenyl or their derivatives. Use of metallocene catalysts in the polymerization of olefins has various advantages. Metallocene catalysts have high activities and are capable of preparing polymers with enhanced physical properties. The key to metallocenes is the structure of the complex. The structure and geometry of the metallocene can be varied to adapt to the specific need of the producer depending on the desired polymer. Metallocenes comprise a single metal site, which allows for more control of branching and molecular weight distribution of the polymer. Monomers are inserted between the metal and the growing chain of polymer.

In a preferred embodiment, the metallocene catalyst has a general formula (I) or (II):

$$(Ar)_2MQ_2 \qquad (I); or$$

$$R''(Ar)_2MQ_2 \qquad (II)$$

wherein the metallocenes according to formula (I) are non-bridged metallocenes and the metallocenes according to formula (II) are bridged metallocenes;

wherein said metallocene according to formula (I) or (II) has two Ar bound to M which can be the same or different from each other;

wherein Ar is an aromatic ring, group or moiety and wherein each Ar is independently selected from the group consisting of cyclopentadienyl, indenyl (IND), tetrahydroindenyl (THI) or fluorenyl, wherein each of said groups may be optionally substituted with one or more substituents each independently selected from the group consisting of halogen, a hydrosilyl, a $SiR_3$ group wherein R is a hydrocarbyl having 1 to 20 carbon atoms, and a hydrocarbyl having 1 to 20 carbon atoms, and wherein said hydrocarbyl optionally contains one or more atoms selected from the group comprising B, Si, S, O, F, Cl and P;

wherein M is a transition metal selected from the group consisting of titanium, zirconium, hafnium and vanadium; and preferably is zirconium;

wherein each Q is independently selected from the group consisting of halogen; a hydrocarboxy having 1 to 20 carbon atoms; and a hydrocarbyl having 1 to 20 carbon atoms and wherein said hydrocarbyl optionally contains one or more atoms selected from the group comprising B, Si, S, O, F, Cl and P; and wherein R" is a divalent group or moiety bridging the two Ar groups and selected from the group consisting of a $C_1$-$C_{20}$ alkylene, a germanium, a silicon, a siloxane, an alkylphosphine and an amine, and wherein said R" is optionally substituted with one or more substituents each independently selected from the group consisting of halogen, a hydrosilyl, a $SiR_3$ group wherein R is a hydrocarbyl having 1 to 20 carbon atoms, and a hydrocarbyl having 1 to 20 carbon atoms and wherein said hydrocarbyl optionally contains one or more atoms selected from the group comprising B, Si, S, O, F, Cl and P.

The term "hydrocarbyl having 1 to 20 carbon atoms" as used herein is intended to refer to a moiety selected from the group comprising a linear or branched $C_1$-$C_{20}$ alkyl; $C_3$-$C_{20}$ cycloalkyl; $C_6$-$C_{20}$ aryl; $C_7$-$C_{20}$ alkylaryl and $C_7$-$C_{20}$ arylalkyl, or any combinations thereof. Exemplary hydrocarbyl groups are methyl, ethyl, propyl, butyl, amyl, isoamyl, hexyl, isobutyl, heptyl, octyl, nonyl, decyl, cetyl, 2-ethylhexyl, and phenyl. Exemplary halogen atoms include chlorine, bromine, fluorine and iodine and of these halogen atoms, fluorine and chlorine are preferred. Exemplary of the alkylene groups is methylidene, ethylidene and propylidene.

Illustrative examples of metallocene catalysts comprise but are not limited to bis(cyclopentadienyl) zirconium dichloride ($Cp_2ZrCl_2$), bis(cyclopentadienyl)titanium dichloride ($Cp_2TiCl_2$), bis(cyclopentadienyl)hafnium dichloride ($Cp_2HfCl_2$); bis(tetrahydroindenyl)zirconium dichloride, bis (indenyl)zirconium dichloride, and bis(n-butyl-cyclopentadienyl)zirconium dichloride; ethylenebis(4,5,6,7-tetrahydro-1-indenyl)zirconium dichloride, ethylenebis(1-indenyl) zirconium dichloride, dimethylsilylene bis(2-methyl-4-phenyl-inden-1-yl) zirconium dichloride, diphenylmethylene (cyclopentadienyl)(fluoren-9-yl) zirconium dichloride, and dimethylmethylene [1-(4-tert-butyl-2-methyl-cyclopentadienyl)](fluoren-9-yl)zirconium dichloride.

The metallocene catalysts generally are provided on a solid support. The support should be an inert solid, which is chemically unreactive with any of the components of the conventional metallocene catalyst. The support is preferably a silica compound. In a preferred embodiment, the metallocene catalyst is provided on a solid support, preferably a silica support.

The term "Ziegler-Natta catalysts" refers to catalysts preferably of the general formula $M^1X_n$, wherein $M^1$ is a transition metal compound selected from group IV to VII, wherein X is a halogen, and wherein n is the valence of the metal. Preferably, $M^1$ is a group IV, group V or group VI metal, more preferably titanium, chromium or vanadium and most preferably titanium. Preferably, X is chlorine or bromine, and most preferably, chlorine. Illustrative examples of the transition metal compounds comprise but are not limited to $TiCl_3$, $TiCl_4$.

The term "chromium catalysts" refers to catalysts obtained by deposition of chromium oxide on a support, e.g. a silica or aluminium support. Illustrative examples of chromium catalysts comprise but are not limited to $CrSiO_2$ or $CrAl_2O_3$.

Preferably, the catalyst is provided on a solid support, more preferably a silica support, most preferably a porous silica support. For the purpose of the invention, the silica is considered to be part of the catalyst. Preferably, the silica support has an average particle diameter d50 between 10 and 100 μm. The d50 is defined as the particle size for which fifty percent by volume of the particles has a size lower than the d50. The d50 is measured by laser diffraction analysis on a Malvern type analyzer after having put the particle in suspension in cyclohexane. Suitable Malvern systems include the Malvern 2000, Malvern 2600 and Malvern 3600 series. The Malvern MasterSizer may also be useful as it can more accurately measure the d50 towards the lower end of the range e.g. for average particle sizes of less 8 μm by applying the theory of Mie, using appropriate optical models.

Preferably, the porous silica support has a surface area between 200 and 700 m$^2$/g. Preferably, the silica support has a pore volume comprised between 0.5 and 3 ml/g. Preferably, the silica support has an average pore diameter comprised between 50 and 300 Angstrom.

In a preferred embodiment of the invention, the silica supported catalyst has an angle of repose preferably smaller than 38 degrees, more preferably smaller than 30 degrees.

By the term "angle of repose" as used herein, it is meant the maximum angle measured in degrees at which a pile of substantially dry solid catalyst particles retains its slope. The angle of repose may be measured for instance by allowing a quantity of substantially dry solid catalyst particles to form a heap. Slippage of the particles will occur so that a sloping surface is exhibited. The angle of the free surface depends principally upon the nature of the bulks solid used. This angle is reasonably consistent for a given bulk solid and is defined as the "angle of repose". The angle of repose of a bulk solid such as a solid catalyst provides an indication of its flow behavior as follows, according to Bulk Solids Handling, p31:

| Angle of repose | Flow behavior |
| --- | --- |
| 25-30 degrees | Very free-flowing |
| 30-38 degrees | Free flowing |
| 38-45 degrees | Fair flowing |
| 45-55 degrees | Cohesive |
| >55 degrees | Very cohesive |

Supported catalyst with the above described angle of repose spontaneously formed a substantially horizontal interface when mixed with a diluent and allowed to sediment.

In a preferred embodiment of this invention, the catalyst is a free-flowing catalyst. As used herein, the term "free flowing catalyst" refers to a catalyst which in its substantially dry state has an angle of repose below 40 degrees, more preferably below 50 degrees, most preferably below 60 degrees. Use of a free flowing catalyst is advantageous to obtain a free flowing catalyst slurry. This facilitates pumping and metering of the slurry and hence catalyst dosing.

Preferably the catalyst used in the invention is a metallocene catalyst or chromium based catalyst. This selection is advantageous as they these catalysts in their substantially dry form exhibit a small angle of repose. These catalysts are free flowing. In a preferred embodiment of a method according to the invention, the above mentioned solid catalyst is a free-flowing catalyst, preferably a metallocene catalyst, more preferably a carrier supported metallocene catalyst, even more preferably a silica supported metallocene catalyst, most preferably a silica supported single site metallocene catalyst.

Preferably, the solid catalyst is present in the storage vessel at a concentration of higher than 10% by weight of the catalyst slurry and preferably up to 60%, more preferably up to 40% and most preferably up to 20% by weight of the slurry. Preferably, catalyst slurry is fed to the catalyst metering device from vessel.

According to another aspect, the invention relates to a method for metering a catalyst slurry comprising the steps of feeding said catalyst slurry to a catalyst metering device as described herein above, wherein said metering device determines an amount of catalyst slurry to be dispensed, and dispensing said metered catalyst slurry. The catalyst slurry is as described herein above.

Preferably, the iron-based alloy steel forming the valve comprises in weight percent: carbon from 1.2 to 1.8%, chromium from 10 to 14%, up to 0.7% manganese, up to 1.0% molybdenum, up to 0.9% silicon, up to 1.1% Vanadium, and at least 80% of iron. Preferably, the body is formed by a material having a Rockwell hardness C of at least 58. Preferably, the body is formed of an iron-based alloy steel comprising in weight percent: carbon from 0.9 to 1.2%, chromium from 16 to 18%, up to 1% manganese, up to 0.75% molybdenum, up to 0.04% phosphorus, up to 1% silicon, up to 0.03% sulfur, and at least 80% iron. Preferably, the metering device determines an amount of catalyst slurry to be dispensed by rotating the piston within the chamber in at least two positions. Preferably, the catalyst slurry is removed from the storage vessel through inlet of the device body and is dispensed in mixing vessel through the outlet of the device body.

Preferably, the catalyst slurry is fed to said catalyst metering device from a vessel comprising a catalyst slurry at a concentration of higher than 10% by weight.

In an embodiment, the method for metering a catalyst slurry comprises feeding said catalyst slurry to the catalyst metering device, dispensing said metered catalyst slurry to a mixing vessel and pumping said catalyst slurry from said mixing vessel to a polymerization reactor. Preferably said catalyst catalyzes the polymerization of olefins. Preferably said polymerization is performed under slurry conditions. Said polymerization process can comprise the step of preparing a slurry by feeding into the reactor: diluent; monomers; catalyst; optionally hydrogen; optionally one or more co-monomers; and optionally activating agent. Preferably, the term "monomer" refers to olefin compound that is to be polymerized. Examples of olefin monomers are ethylene and propylene.

Preferably said reactor is a loop reactor. Preferably, the polymerization reactor comprises at least one loop. More preferably, the reactor is connected in series with another loop reactor, creating a double loop reactor connected in series, or "double loop reactor". In this embodiment, the polymerization reactor is a double loop reactor. According to an embodiment, the catalyst slurry is fed into a first loop reactor of a double loop reactor comprising a first loop reactor connected in series to a second loop reactor.

The catalyst feeding process preferably comprises the subsequent steps of: a) providing solid catalyst and a hydrocarbon diluent in one or more storage vessels such that a catalyst slurry is obtained in said vessel, b) transferring said catalyst slurry from said storage vessel to a mixing vessel, via catalyst metering device according to the invention, wherein said catalyst slurry is diluted for obtaining a suitable concentration for use in a polymerization reaction, and c) pumping said diluted catalyst slurry at a controlled flow rate from said mixing vessel to said polymerization reactor through one or more conduits, by means of a pumping means, provided in each of said conduits.

The concentration of the catalyst in the slurry in mixing vessel is preferably between 0.1% and 10% by weight, more preferably between 0.5-5% by weight and most preferably between 1-3% by weight.

Preferably, the catalyst slurry comprises solid catalyst and diluent, wherein said solid catalyst is provided on a silica support, preferably a porous silica support. Preferably, according to one embodiment the catalyst is a metallocene catalyst. According to another embodiment, the catalyst is preferably a chromium catalyst.

Preferably, the pressure in the storage vessel is preferably from 4 to 16 barg (equivalent to 5 to 17 bar), more preferably from 7 to 11 barg, for example 9 berg. The pressure in the mixing vessel is preferably from 2 to 16 barg, more preferably from 3 to 7 barg and most preferably 5 barg. Barg is zero referenced against ambient air pressure, so it is equal to absolute pressure minus atmospheric pressure. 1 barg is equivalent to 2 bar. Preferably, the mixing vessel is filled with liquid.

According to a preferred embodiment, the method comprises transferring said catalyst slurry from a storage vessel to a mixing vessel at a controlled flow rate, by controlling the ratio between diluent and catalyst in the mixing vessel. Control of the flow rate is enabled by providing a catalyst feeding system for feeding catalyst slurry from the storage vessel to the mixing vessel, which comprises a conduit 6, connected to said vessel and catalyst metering device according to the invention on said conduit. The catalyst flow from the storage vessel to the mixing vessel is regulated by the catalyst metering device and is dependent on the dosed amount (concentration) of catalyst and diluent in the mixing vessel. The ratio between diluent and catalyst is adequately controlled. This is enabled by adequate control of catalyst supply from the storage vessel by means of the catalyst feeding system and catalyst metering device, and by release of a suitable amount of isobutane diluent in the mixing vessel. The present catalyst metering device with its rotatable catalyst metering valve formed of an iron-based alloy steel hardened to a Rockwell hardness C of at least 60 allows for precise and well-controlled dosing over time of abrasive catalyst slurry, in particular silica supported catalyst slurry, while avoiding mechanical wear of the valve.

The invention claimed is:

1. A method for metering a catalyst slurry comprising the steps of:
feeding said catalyst slurry to a catalyst metering device, said catalyst metering device comprising a body, having an inlet, an outlet, and a rotatable catalyst metering valve, wherein the rotatable catalyst metering valve comprises a catalyst metering chamber operably connected to said inlet and outlet, and a piston arranged within the catalyst metering chamber, wherein the rotatable catalyst metering valve comprises an iron-based alloy steel having a Rockwell hardness C of at least 60, wherein said metering device determines an amount of catalyst slurry to be dispensed, and dispensing said metered catalyst slurry.

2. Method according to claim 1, wherein said iron-based alloy steel comprises in weight percent: carbon from 1.2 to 1.8%, chromium from 10 to 14%, up to 0.7% manganese, up to 1.0% molybdenum, up to 0.9% silicon, up to 1.1% Vanadium, and at least 80% of iron.

3. Method according to claim 1, wherein the body (16) is formed by a material having a Rockwell hardness C of at least 58.

4. Method according to claim 1, wherein the body is formed of an iron-based alloy steel comprising in weight percent: carbon from 0.9 to 1.2%, chromium from 16 to 18%, up to 1% manganese, up to 0.75% molybdenum, up to 0.04% phosphorus, up to 1% silicon, up to 0.03% sulfur, and at least 80% iron.

5. Method according to claim 1, wherein said metering device determines an amount of catalyst slurry to be dispensed by rotating the piston within the body in at least two positions.

6. Method according to claim 1, wherein said catalyst slurry is fed to said catalyst metering device from a vessel comprising a catalyst slurry at a concentration of higher than 10% by weight.

7. Method according to claim 1, wherein the catalyst slurry comprises a solid catalyst and diluent, wherein said solid catalyst is provided on a silica support.

8. Method according to claim 1, wherein said solid catalyst is provided on a porous silica support.

9. Method according to claim 1, wherein the catalyst is a metallocene catalyst.

10. Method according to claim 1, wherein the catalyst is a chromium catalyst.

11. Method according to claim 1, wherein the solid catalyst is present at a concentration of higher than 10% by weight.

12. Method according to claim 1, comprising feeding said catalyst slurry to the catalyst metering device, dispensing said metered catalyst slurry to a mixing vessel and pumping said catalyst slurry from said mixing vessel to a polymerization reactor.

13. Method according to claim 1, wherein said catalyst catalyzes the polymerization of olefins.

14. Method according to claim 1, wherein said polymerization is performed under slurry conditions.

15. Method according to claim 1, wherein said polymerization reactor is a loop reactor, preferably a double loop reactor.

* * * * *